(12) United States Patent
Heim

(10) Patent No.: US 11,771,009 B2
(45) Date of Patent: Oct. 3, 2023

(54) METHOD AND SYSTEM FOR CONVEYING MATERIAL IN A COMBINE HARVESTER

(71) Applicant: Casey Heim, Hoxie, KS (US)

(72) Inventor: Casey Heim, Hoxie, KS (US)

( * ) Notice: Subject to any disclaimer, the term of this patent is extended or adjusted under 35 U.S.C. 154(b) by 508 days.

(21) Appl. No.: 17/051,946

(22) PCT Filed: Apr. 30, 2019

(86) PCT No.: PCT/US2019/029911
§ 371 (c)(1),
(2) Date: Oct. 30, 2020

(87) PCT Pub. No.: WO2019/213077
PCT Pub. Date: Nov. 7, 2019

(65) Prior Publication Data
US 2021/0127588 A1    May 6, 2021

Related U.S. Application Data

(60) Provisional application No. 62/664,276, filed on Apr. 30, 2018.

(51) Int. Cl.
| | | |
|---|---|---|
| *A01F 12/48* | (2006.01) | |
| *A01D 90/10* | (2006.01) | |
| *B65G 53/06* | (2006.01) | |
| *A01F 12/60* | (2006.01) | |
| *A01F 25/14* | (2006.01) | |
| *A01D 46/08* | (2006.01) | |

(Continued)

(52) U.S. Cl.
CPC .............. *A01F 12/48* (2013.01); *A01D 90/10* (2013.01); *B65G 53/06* (2013.01); *A01D 45/16* (2013.01); *A01D 46/005* (2013.01); *A01D 46/08* (2013.01); *A01F 12/60* (2013.01); *A01F 25/14* (2013.01); *A01F 25/183* (2013.01); *B65G 53/28* (2013.01); *Y10S 55/32* (2013.01)

(58) Field of Classification Search
CPC ......... B65G 53/06; B65G 53/28; A01F 12/48; A01F 12/60; A01F 25/14; A01F 25/183; A01D 90/10; A01D 45/16; A01D 46/005; A01D 46/08; Y10S 55/32
See application file for complete search history.

(56) References Cited

U.S. PATENT DOCUMENTS

| | | | | |
|---|---|---|---|---|
| 3,014,485 | A | * 12/1961 | Karlsson ................. | A01F 12/48 460/60 |
| 3,219,394 | A | * 11/1965 | Moss ..................... | B65G 53/24 406/171 |

(Continued)

FOREIGN PATENT DOCUMENTS

| | | | | |
|---|---|---|---|---|
| FR | 2294627 | A * | 8/1976 | ........... A01D 46/005 |
| FR | 2890284 | A1 * | 3/2007 | ............. A01F 25/14 |

(Continued)

*Primary Examiner* — Arpad F Kovacs
(74) *Attorney, Agent, or Firm* — Law Office of Julie Scott LLC

(57) ABSTRACT

A method and system of a pneumatic conveying system for moving separated grain and small plant material to an onboard storage tank or out of the combine harvester. The pneumatic conveying system having a gateway for introducing the material into an air flow channel, and with a diverter valve or an airlock directing separated grain and small plant material to the tank or outside of the harvester.

20 Claims, 1 Drawing Sheet

(51) Int. Cl.
  *A01D 46/00* (2006.01)
  *B65G 53/28* (2006.01)
  *A01F 25/18* (2006.01)
  *A01D 45/16* (2006.01)

(56) References Cited

U.S. PATENT DOCUMENTS

| | | | | | |
|---|---|---|---|---|---|
| 3,332,220 | A | * | 7/1967 | Lofgreen | A01D 46/10 56/30 |
| 3,387,437 | A | * | 6/1968 | Owen | A01D 46/10 56/13.2 |
| 3,872,655 | A | * | 3/1975 | Davis, Sr. | A01D 45/16 56/330 |
| 3,964,242 | A | * | 6/1976 | Stone | A01D 46/08 56/13.3 |
| 4,441,511 | A | * | 4/1984 | Schroeder | A01F 12/48 460/13 |
| 7,168,228 | B2 | * | 1/2007 | Lukac | A01D 46/08 56/30 |
| 2002/0004418 | A1 | * | 1/2002 | Mesquita | A01D 89/001 460/115 |
| 2017/0121130 | A1 | * | 5/2017 | Bent | A01C 7/081 |

FOREIGN PATENT DOCUMENTS

| | | | | | |
|---|---|---|---|---|---|
| GB | 1566277 | A | * | 4/1980 | B65G 53/28 |
| GB | 2302075 | A | * | 1/1997 | A01C 7/081 |
| JP | 2001204234 | A | * | 7/2001 | A01F 12/46 |
| JP | 2001204239 | A | * | 7/2001 | A01F 12/60 |
| JP | 2001224240 | A | * | 8/2001 | A01F 12/48 |
| JP | 2004159615 | A | * | 6/2004 | A01F 12/60 |
| JP | 2004236532 | A | * | 8/2004 | A01F 12/46 |
| JP | 2010004801 | A | * | 1/2010 | A01F 12/46 |
| JP | 2010075128 | A | * | 4/2010 | A01F 12/46 |
| JP | 2018011533 | A | * | 1/2018 | A01D 41/02 |
| KR | 20060127781 | A | * | 12/2006 | A01F 12/48 |
| RU | 2316933 | C1 | * | 2/2008 | A01D 41/12 |
| WO | WO-2018016321 | A1 | * | 1/2018 | A01D 41/02 |

* cited by examiner

METHOD AND SYSTEM FOR CONVEYING MATERIAL IN A COMBINE HARVESTER

BACKGROUND OF THE INVENTION

A. Field of the Invention

The present invention relates to an improved method and system for conveying material in a combine harvester.

B. Description of the Related Art

During harvesting, it is desirable to harvest grain quickly and efficiently while causing as little damage to the grain as possible. With these objectives in mind, a variety of large combine harvesters have been developed over the years.

A number of solutions for conveying material in a combine harvester exist. These solutions attempt to convey the harvested material using variations of conventional methods and devices. It is not unusual to need to use multiple combinations of mechanical conveying systems—such as screw conveyors/augers, paddle belts, paddle wheels, paddle chain conveyors, etc.—to move grain to the desired location such as an onboard grain tank at the top of a combine harvester.

All of these solutions include numerous moving components that are subject to wear and breakdown during use. Replacing worn parts or repairing them after a breakdown increases costs and can lead to delays during harvesting, which can cause further financial costs or losses. Not only do these mechanical conveying systems provide additional sources of component wear and damage, they add weight and increased energy and fuel consumption. A need exists in the market to reduce the costs and potential losses that are inherently present in the mechanical methods and systems that are currently used to convey harvested crops in the field.

SUMMARY OF THE INVENTION

The present invention advantageously fills the aforementioned deficiencies by providing a system and a method of positive pressure to pneumatically convey material in a combine harvester. This system and method is potentially more economical to use, easier to manufacture and repair, and more durable than conventional technologies.

The present invention provides an improved method and system for harvesting grain that simplifies the handling of material in a combine harvester by implementing a pneumatic conveying system. Advantageously, the system and method of the present invention use fewer moving parts than conventional technologies and can be comparatively lightweight. It is expected that these reductions can contribute to measurable savings in the fuel, repair, and replacement costs that are associated with harvesting grain.

The present invention provides a method and system of conveying harvested material, in particular of grain, within or out from a combine harvester by using positive air pressure, which provides for a lighter, simpler process of material handling. By using a pneumatic air system within a combine harvester, the number of moving parts that come in contact with harvested material is reduced; harvesting is simplified; and the amount of handling of the material, especially of grain, is reduced.

Systems of the present invention have more flexible layouts than conventional methods, which allows for the incorporation of different materials, easier cleaning, and potentially greater ease for process automation. Further, the flexible layouts allow the invention to be utilized in a variety of different types of combine harvesters. Those of skill in the art will appreciate that this flexibility allows for either all, or portions, of systems of the invention to be located inside or outside of a combine harvester. It is envisioned that by allowing some portions of a system to be located on the outside of a combine harvester that retrofitting an existing combine harvester may be more easily and cost-effectively achieved.

The disclosed method and system are unique when compared to other known processes and solutions in that it: (1) has relatively fewer moving parts; (2) has layout flexibility (i.e. the blower can be placed virtually anywhere on the combine harvester, while the duct work can be routed around or between any fixed component(s)); (3) is easy to clean out because a system can be purged with a strong blast of air to remove any remaining particles; and (4) offers ease of process automation.

As compared to other known processes, the disclosed method and system include fewer components than a conventional mechanical conveying system; combine components that are traditionally not used in a combine harvester such as a blower(s), airlock(s), eductor(s) (i.e. a venturi or venturi valve), and diverter valve(s); and use forced air to convey material, such as grain, by requiring fewer components than comparable systems that are mechanically or hydraulically driven.

It is a further objective of the present invention to create a system that by having fewer moving components, as compared to other conventional solutions, to enable the device to last longer and require fewer repairs.

Skilled artisans will appreciate that grain must be separated from other materials (e.g. other plant parts, debris, etc.) during harvesting. Specifically, harvesting includes bringing collected plant material into a combine harvester; conveying the collected plant material to a processor inside the combine harvester to separate the grain and small plant material from large plant material; conveying the grain and small plant material from the processor to a separator inside the combine harvester that separates the grain from the small plant material; and then conveying the separated grain to another area, either inside or outside the combine harvester, for storage. The present invention provides an improved system and method for conveying grain after it has been separated.

In particular, the present invention provides a method comprising (a) taking air into a first portion of a pneumatic conveying system (or pneumatic system) to cause airflow (i.e. positive pressure) within the pneumatic system, wherein the first portion of the pneumatic system includes an air intake system, an originator of positive air pressure, a first channel through which air moves, a first gateway, and a second channel through which air and grain move; (b) conveying grain into the first gateway; (c) conveying grain through the second channel to a diverter valve; and (d) directing the diverter valve to move the grain either (i) into a second portion of the pneumatic system that comprises a third channel through which the grain moves to an onboard storage tank, or (ii) into a third portion of the pneumatic conveying system that includes a fourth channel through which the grain moves out of the combine harvester.

The invention further comprises moving stored grain from the storage tank through the fourth channel and out of the combine harvester. Advantageously, grain can be moved from the storage tank through the fourth channel while simultaneously directing the diverter valve to move grain directly into the third portion (i.e. the fourth channel) of the pneumatic conveying system and out of the combine harvester.

The present invention also provides a pneumatic conveying system for transporting grain within a combine harvester comprising a first portion that includes an air intake system, an originator of positive air pressure, a first channel through which air moves, a first gateway, and a second channel through which air and grain move; a diverter valve; a second portion that comprises a third channel through which grain moves to a storage tank on a combine harvester; and a third portion that includes a fourth channel through which grain is moved out of the combine harvester.

Methods and systems of the present invention include a second gateway in the third portion of the pneumatic conveying system so that the fourth channel is separated from the onboard storage tank.

Suitable devices for either a first gateway or a second gateway include an eductor (i.e. venturi or venturi valve), an airlock, a slide gate, or a combination thereof. The first and second gateways do not need to be identical. For example, in one system of the invention a first gateway may be a simple tube that an operator cannot adjust to regulate the amount of grain that enters into a channel, and second gateway can be adjusted to regulate the amount of grain that enters into a channel.

Preferred airlocks include a rotor, turbine, wheel, roller, spindle, or similar part to prevent the unwanted entry of grain from the storage tank into the fourth channel. More preferably, an operator can regulate the rate of entry of grain into the channel from the storage tank. Skilled artisans will appreciate that other available devices can be substituted for an eductor, airlock or slide gate. For example, a simple tube with a cover or flap that opens and closes may be used. It is only necessary that a device can prevent the entry of grain into a channel in the system and can be opened or closed by an operator. It is more desirable that the device can also regulate the rate at which the grain enters into the channel.

In a preferred embodiment of the present invention, the second gateway regulates the amount of grain that can flow into the system from the onboard storage tank. Preferably, an operator can regulate the second gateway by adjusting the speed of a rotor in the second gateway. For example, increasing the rotor speed of an airlock (i.e. the second gateway) will allow more grain to fall into the third portion (fourth channel) of the system. Alternatively, stopping the rotor of the airlock (the second gateway) prevents grain from entering the third portion (fourth channel) of the system. Comparable adjustments can be made to any suitable device that is used as a second gateway. It is expected that for ease of use, the controller for the second gateway is located with the other controls for the combine harvester. A controller may be a simple on/off switch or adjustable. Those of skill in the art will recognize that a variety of suitable controllers are known and readily available.

A wide variety of air intake systems are currently known and several are suitable for use in the present invention. The choice of air intake system will depend at least in part upon the design of the combine harvester into which the system will be placed, the rate at which air and grain are to be moved through a system of the invention, and the length(s) and diameter(s) of the various channels through which air and grain are to move.

Suitable air intake systems for the present invention include an air filter and an originator of positive air pressure. Originators of positive air pressure include fans, blowers, air compressors, motors, or combinations thereof. They may be belt driven, hydraulically driven, or directly driven (e.g. a blower connected directly to a motor). Those of skill in the art will appreciate that more than one fan, blower, air compressor, or combination thereof may be present in an embodiment of the invention. The choice of the type and number of originators of positive air pressure to use will depend at least in part upon the design of any particular combine harvester, the length and bends of the system, and the amount or rate of flow to be generated.

The first, second, third, and fourth channels of the system and method of the present invention can comprise tubes, pipes, hoses, or combinations thereof. The channels can be flexible or rigid. The preferred compositions of the channels will be, at least in part, determined by the type of grain to be harvested, operator preference, and the configuration of the system. Thus, some portions of a system may be flexible and other portions rigid. The channels may be made from a wide variety of materials that are commonly used for hoses and tubes such as various plastics, derivatives of plastic, metals, metal alloys, and combinations thereof. Preferably, the interiors of the channels are relatively smooth such that grain can move unimpeded, and the bends in the channels are minimized.

Those of skill in the art will appreciate that any of the channels may comprise multiple sections of tubes, pipes, hoses, or combinations thereof. The number of sections that comprise any one channel will depend at least in part upon the design of the particular combine harvester into which a system of the invention is placed. Further, an operator may prefer to use multiple sections for any channel so that maintenance of the claimed system, as well as other components of a combine harvester, are more easily maintained or replaced.

Preferred embodiments of the invention include at least one connector to connect a component part, e.g. air filter, originator of positive air pressure (such as a fan, blower, air compressor, motor, or combination thereof), diverter valve, first or second gateway (such as an eductor, airlock, slide gate, or a combination thereof), or a combination thereof to the channel. Connectors include clamps, interlocking parts, as well as, other types of commonly used fasteners. The connector(s) allows a component part to be more readily removed and replaced without disrupting the remainder of the system. A flange, clamp, or other means of forming a sealed connection can be associated with each connector so that an airtight seal is maintained during operation.

Preferably, an actuator is used to control a diverter valve in the present invention. Preferred actuators can be linear actuators or rotary actuators. The actuator is located on or adjacent to the diverter valve. Alternatively, the actuator may be combined with the diverter valve to form a single part. More preferably, the controller for the diverter is located with the other controls for the combine harvester so that the operator can easily direct the direction of flow within the system.

An operator may adjust the originator of positive air pressure (e.g. a fan, blower, air compressor, motor, etc.) so that air (or air and grain) moves at a faster or slower rate throughout the system. The speed at which grain moves through the system depends, at least in part, upon the weight and size of the grain to be moved, the distance that the grain is to travel, the configuration of the system, as well as, the optimal speed at which a particular type of grain can be moved with minimal damage. Skilled artisans will appreciate that some materials can behave differently from one day to the next due to effects of environmental elements (e.g. humidity, moisture content of grain, altitude, etc.).

Advantageously, after grain has been removed from the combine harvester, the operator can increase airflow (i.e. increase air pressure) throughout the system to quickly purge it of any remaining matter so that the system is ready for use.

The present invention provides an improved method of harvesting grain comprising (a) bringing collected plant material into a combine harvester; (b) conveying the collected plant material to a processor inside the combine harvester, wherein grain and small plant material is separated from large plant material; (c) conveying the grain and small plant material from the processor to a separator inside the combine harvester, wherein the grain is separated from the small plant material; (d) taking air into a first portion of a pneumatic conveying system, wherein the first portion of the pneumatic conveying system includes an air intake system, an originator of positive air pressure, a first channel through which air moves, a gateway, and a second channel through which air and separated grain move; (e) conveying separated grain into the gateway; (f) conveying the separated grain through the second channel to a diverter valve; and (g) directing the diverter valve to either move the separated grain (i) into a second portion of the pneumatic conveying system, wherein this second portion of the pneumatic conveying system comprises a third channel through which the separated grain moves to an onboard storage tank, or (ii) into a third portion of the pneumatic conveying system, wherein this third portion of the pneumatic conveying system includes a fourth channel through which the separated grain is moved out of the combine harvester.

The methods and systems of positive pressure pneumatic conveying material in a combine harvester may be embodied in many different forms and should not be construed as being limited to the embodiments set forth herein; rather, these embodiments are provided by way of illustration only and so that this disclosure will be thorough, complete and fully convey understanding to those skilled in the art. Thus, the present invention should not be limited to the illustrative embodiments and techniques presented herein. Further, while specific advantages of the invention are detailed herein, various embodiments may include some, none, or all of these enumerated advantages.

BRIEF DESCRIPTION OF THE DRAWINGS

The following drawings form part of the present specification and are included to further demonstrate certain aspects of the present invention. The invention may be better understood by reference to one or more of these drawings in combination with the detailed description presented herein. Unless specifically noted, articles depicted in the drawings are not necessarily drawn to scale.

DETAILED DESCRIPTION

The invention provides a pneumatic driven method and system for conveying grain in or away from a combine harvester. By using positive air pressure, fewer moving parts are needed to convey the grain as compared to conventional technologies. Further, the system of the invention is adaptable to a wide variety of combine harvesters because the system can be readily adjusted into a variety of configurations.

While different types of grain require some variation in the methods and devices that are used for harvesting them, the basic steps of harvesting—gathering the crop from the field, separating the grain from material other than grain (MOG), and cleaning the grain—are essentially the same. In all cases, the objective is to separate the grain efficiently and quickly while damaging the grain as little as possible. Separated grain is relatively fragile and can be damaged when being moved to storage. The present invention reduces the risk of damage to the grain by reducing the amount of mechanical manipulation to which the grain is subjected.

Figure 1:
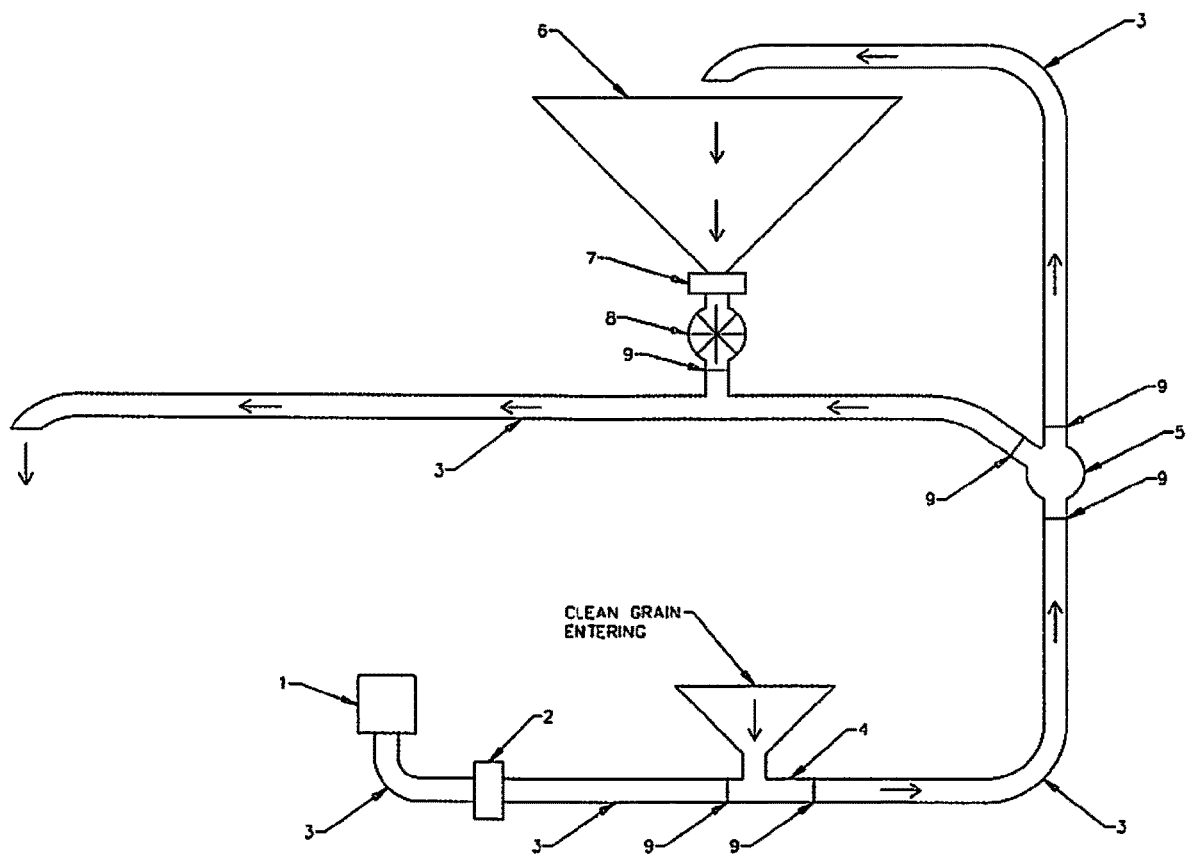
FIG. 1 illustrates a pneumatic conveying system as it can be incorporated into a combine harvester. The direction of air or grain flow is indicated by arrows (→). Various components of the system are represented by graphic symbols or structures.

FIG. 1 illustrates the basic components of the methods and systems of the present invention. Air enters into the system through an air intake system. The air intake system comprises an air filter 1 that connects to a first section of a channel 3 that, in turn, connects to an originator of positive air pressure 2 (e.g. a fan, blower, air compressor, motor, etc.). When activated, the originator of positive air pressure 2 draws outside air through the air filter 1 into the channel 3. (Herein, the channel is described in sections for ease of understanding. Skilled artisans will understand that the channel is effectively one continuous piece, and the different sections (portions) of the channel that are described herein are not necessarily separate and distinct parts.)

Air moves through the channel 3 in the direction indicated by the arrows (see FIG. 1). Grain that has been separated (i.e. cleaned from MOG) is directed into an eductor 4 through which the grain moves into a second section of the channel 3. Alternatively, an airlock, slide gate, or a combination thereof can be substituted for the gateway 4. The pneumatic air pressure created by the originator 2 pushes/pulls the grain through the channel 3 as indicated in FIG. 1. An operator can regulate the rate of movement of the grain in the channel 3 by adjusting the rate of airflow within the channel 3. The operator can regulate rate of airflow generated by the originator 2 with a controller (an actuator) (not shown in FIG. 1) that is located with the other controls for the combine harvester. The controller may be a simpler on/off switch or other type of control that is known in the art for regulating an originator.

Once the grain enters into the channel 3, the grain moves towards a diverter valve 5. Using the diverter valve 5, an operator can choose to direct the grain through a third section of the channel 3 to be stored within the combine harvester in an onboard storage tank 6 or to direct the grain into a fourth section of the channel 3 and move the grain out of the combine harvester to a separate storage area (e.g. a bin or storage truck, not shown).

If the grain is placed in an onboard storage tank 6, then the operator can move the grain from the onboard storage tank 6 into the channel 3 by opening a gateway 7, airlock 8, or a combination thereof Alternatively, an eductor (venturi valve), or a combination of an eductor and a slide gate may be substituted for the gateway 7 and airlock 8 to accomplish the same function. The gateway 7 and airlock 8 separate the storage tank from the channel 3. Gravity moves the grain into the channel 3 from the storage tank. The operator adjusts the originator 2 to regulate the airflow, as well as, the speed at which the grain moves through the channel 3 so that damage to the grain is minimized.

While FIG. 1 illustrates an embodiment that uses only one air intake system, those of skill in the art will recognize that two or more air intake systems can be used in embodiments of the invention. The number of air intake systems that are present in part is determined by a number of factors including the size and type of grain that is to be moved; the size and configuration of the combine harvester in which the embodiment is located; the specific configuration of the embodiment in the combine harvester; and the preferences of the operator.

Figure 2:
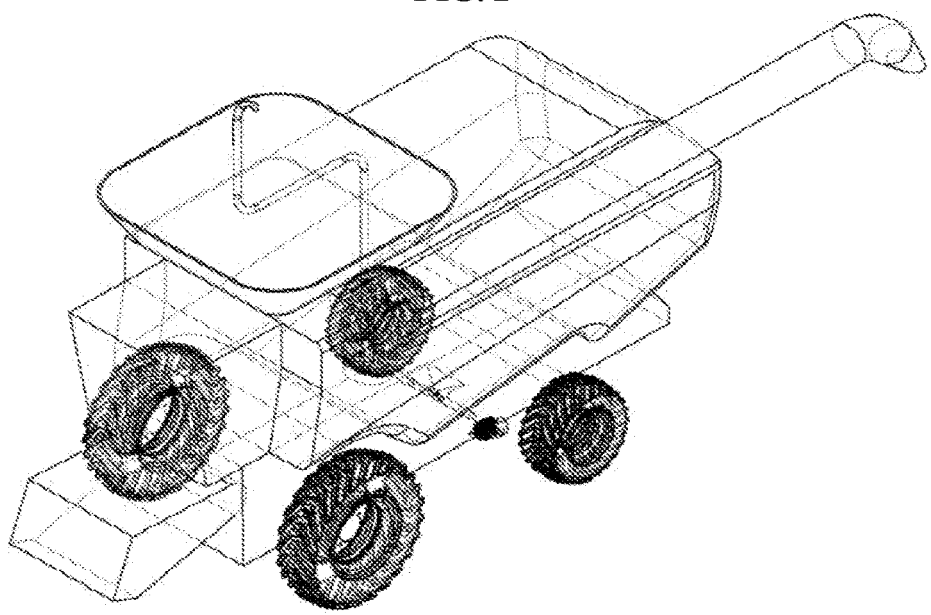
FIG. 2 illustrates one configuration of a positive pressure pneumatic conveying system that is incorporated inside a combine harvester.

Embodiments of the invention are intended to have flexible configurations so that the invention can be adapted to fit a wide variety of combine harvesters. FIG. 2 illustrates one possible configuration within a combine harvester. Skilled artisans will recognize that a variety of configurations are possible and can achieve similar results for any one embodiment of the invention. To allow for a variety of configurations for any embodiment, systems of the invention can include multiple connectors 9 (see FIG. 1). Connectors can be located anywhere within the system so that an operator can remove a component or a section of channel as needed for maintenance or repair of either the combine harvester or the embodiment of the invention.

In some embodiments, additional components (not shown in FIG. 1) are included. For example, silencer(s) may be included to attenuate undesirable sound or vibration or additional filters may be included to protect various components from foreign material or contamination, as well as, to prevent any foreign material or contamination from entering the system.

Unless defined otherwise, all technical and scientific terms used herein have the same meaning as is commonly understood by one of skill in the art to which this invention belongs at the time of filing. Terminology used herein is for the purpose of describing particular embodiments of the invention and is not intended to be limiting. The meaning and scope of terms should be clear; however, in the event of any latent ambiguity, definitions provided herein take precedent over any dictionary or extrinsic definition. Further, unless otherwise required by context, singular terms shall include pluralities and plural terms shall include the singular unless the content clearly dictates otherwise. Any patents or publications referred to herein are incorporated by reference to the extent that they providing teachings or information that is helpful in the practice of the claimed invention.

What is claimed is:

1. A method of conveying grain comprising
   a) taking air into a first portion of a pneumatic conveying system that is inside a combine harvester, wherein the first portion of the pneumatic conveying system includes an air intake system, an originator of positive air pressure, a first channel through which air moves, a first gateway, and a second channel through which air and grain move;
   b) conveying grain into the first gateway;
   c) conveying the grain through the second channel to a diverter valve;
   d) directing the diverter valve to move the grain either (i) into a second portion of the pneumatic system that comprises a third channel through which the grain moves to an onboard storage tank, or (ii) into a third portion of the pneumatic system that includes a fourth channel through which grain is moved out of the combine harvester.

2. The method of claim 1 further comprises moving stored grain from the storage tank through the fourth channel and out of the combine harvester.

3. The method of claim 1, wherein the air intake system includes an air filter.

4. The method of claim 1, wherein the originator of positive air pressure is a fan, blower, air compressor, motor, or combination thereof.

5. The method of claim 1, wherein the first, second, third, and fourth channels comprise tubes, pipes, hoses, or combinations thereof.

6. The method of claim 1, wherein an actuator controls the diverter valve.

7. The method of claim 1, wherein the third portion of the pneumatic system further comprises a second gateway that separates the fourth channel from the onboard storage tank.

8. The method of claim 7, wherein the first gateway is an eductor, an airlock, a slide gate, or a combination thereof, and the second gateway is an eductor, an airlock, a slide gate, or a combination thereof.

9. The method of claim 8, wherein at least one connector attaches the air filter, originator of positive air pressure, first gateway, second gateway, diverter valve, airlock, slide gate, or any combinations thereof to the channel.

10. A pneumatic conveying system for transporting grain within a combine harvester comprising
    a) a first portion that includes an air intake system, an originator of positive air pressure, a first channel through which air moves, a first gateway, and a second channel through which air and grain move;
    b) a diverter valve;
    c) a second portion that comprises a third channel through which grain moves to a storage tank on a combine harvester; and
    d) a third portion that includes a fourth channel through which grain moves out of the combine harvester, wherein the diverter valve separates the first portion from the second and third portions of the conveying system.

11. The pneumatic conveying system of claim 10, further comprising a second gateway between the storage tank and fourth channel.

12. The pneumatic conveying system of claim 10, wherein the air intake system includes an air filter.

13. The pneumatic conveying system of claim 10, wherein the originator of positive air pressure is a fan, blower, air compressor, motor, or combination thereof.

14. The pneumatic conveying system of claim 10, wherein the first, second, third, and fourth channels comprise tubes, pipes, hoses, or combinations thereof.

15. The pneumatic conveying system of claim 11, wherein the first gateway is an eductor, an airlock, a slide gate, or a combination thereof, and the second gateway is an eductor, an airlock, a slide gate, or a combination thereof.

16. The pneumatic conveying system of claim 10, further comprising an actuator that controls the diverter valve.

17. The pneumatic conveying system of claim 16, wherein the actuator is a linear actuator or a rotary actuator.

18. The pneumatic conveying system of claim 16, wherein the actuator and diverter valve are combined into a single part.

19. The pneumatic conveying system of claim 15, wherein at least one connector attaches the air filter, originator of positive air pressure, first gateway, second gateway, diverter valve, airlock, slide gate, or any combination thereof to the channel.

20. A method of harvesting grain comprising
    a) bringing collected plant material into a combine harvester;
    b) conveying the collected plant material to a processor inside the combine harvester, wherein grain and small plant material is separated from large plant material;

c) conveying the grain and small plant material from the processor to a separator inside the combine harvester, wherein the grain is separated from the small plant material; and
d) taking air into a first portion of a pneumatic conveying system, wherein the first portion of the pneumatic conveying system includes an air intake system, an originator of positive air pressure, a first channel through which air moves, a gateway, and a second channel through which air and separated grain move;
e) conveying separated grain into the gateway;
f) conveying the separated grain through the second channel to a diverter valve; and
g) directing the diverter valve to either move the separated grain (i) into a second portion of the pneumatic conveying system, wherein this second portion of the pneumatic conveying system comprises a third channel through which the separated grain moves to an onboard storage tank, or (ii) into a third portion of the pneumatic conveying system, wherein this third portion of the pneumatic conveying system includes a fourth channel through which the separated grain is moved out of the combine harvester.

\* \* \* \* \*